Oct. 12, 1965  E. L. CLARK  3,211,644
LIQUID PHASE SULFUR REMOVAL FROM HYDROCARBONS WITH ZEOLITE
Filed March 15, 1960
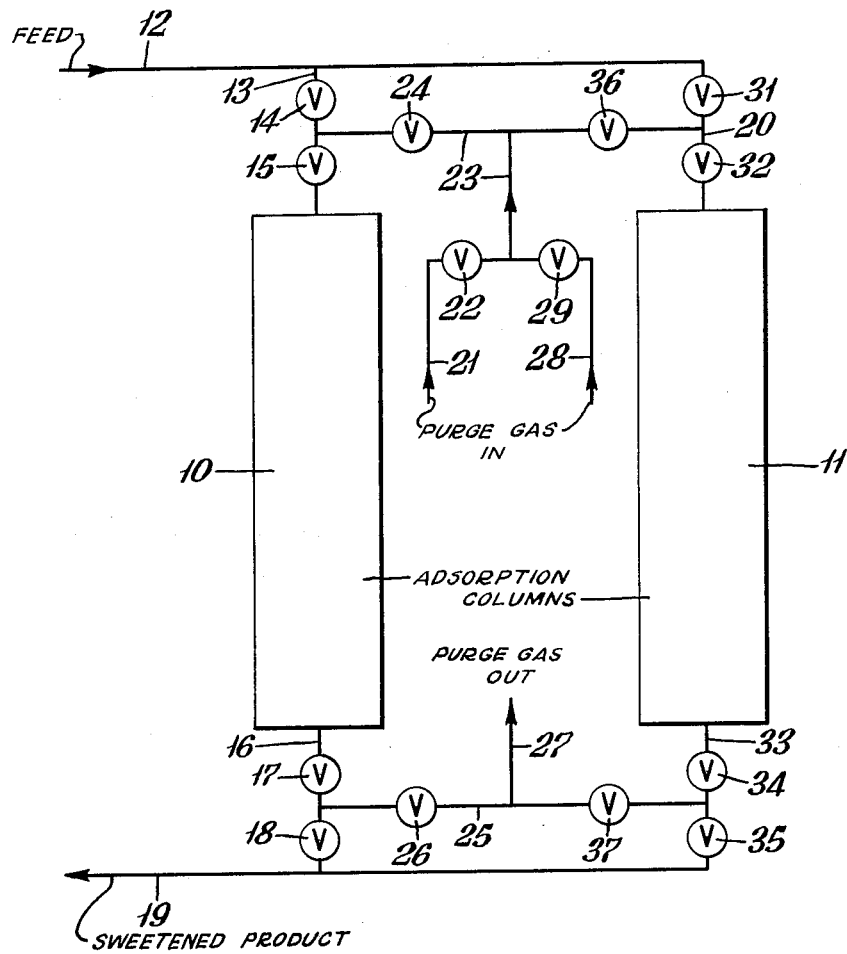
INVENTOR.
EDWARD L. CLARK
BY
William H. Mesinger
ATTORNEY

United States Patent Office 3,211,644
Patented Oct. 12, 1965

3,211,644
LIQUID PHASE SULFUR REMOVAL FROM HYDROCARBONS WITH ZEOLITE
Edward L. Clark, Houston, Tex., assignor to Union Carbide Corporation, a corporation of New York
Filed Mar. 15, 1960, Ser. No. 15,109
11 Claims. (Cl. 208—245)

This invention relates to liquid phase sweetening of hydrocarbons, and more specifically relates to an improved method for removing sulfur-containing compounds from a liquid hydrocarbon feed stream by contact with an absorbent material.

The removal of hydrogen sulfide and other sulfur compounds such as the mercaptans from hydrocarbon streams is desired for various reasons depending upon the final use of the hydrocarbon. The lower boiling hydrocarbons such as propane and butane are utilized in large volumes as domestic fuel, and sulfur compounds are objectionable since they impart unpleasant odor. The higher boiling hydrocarbons particularly in the range of 5 to 10 carbon atoms are used as feed for catalytic reformer and isomeizer units, and the sulfur compounds are deleterious to the expensive catalysts employed therein.

There are a number of sweetening methods currently being used, but they all have important and critical limitations. One widely used system involves scrubbing by monoethanolamine (MEA). The hydrocarbon feed stream is passed through the MEA solution which absorbs the hydrogen sulfide. The solution from the absorption equipment is passed to a stripping column where heat is applied to boil the solution and release the hydrogen sulfide. The lean stripped solution is then passed to heat exchangers, and returned to the absorption equipment to again absorb hydrogen sulfide gas. The principal disadvantages of the MEA system are its high operating cost because of the corrosive nature of the absorbing liquid, and its inability to remove mercaptans from feed streams.

Another prior art system is the iron sponge method of sweetening hydrocarbons, utilizing iron oxide impregnated wood chips in a packed bed. The feed stream containing $H_2S$ and/or mercaptans contacts a packed bed of iron oxide sponge, preferably chemically absorbing the sulfur impurities on the exposed oxide surface. After the bed has been saturated it is reactivated by passing heated air through the bed. One disadvantage of this method of sweetening hydrocarbon streams is that the reactivation step is hazardous because of the exothermic nature of the reactivation reaction. Furthermore, fusion of iron sponge particles with sulfur ferquently causes a high pressure drop through the bed. Finally, the operational cost is high because the absorbent must be replaced frequently.

Hydrogen sulfide has also been removed from hydrocarbons by countercurrent extraction with a hot potassium carbonate solution. In this unit as in the MEA system, the $H_2S$ is removed by chemical combining with potassium carbonate and later released by stripping with steam. One significant disadvantage of this method of sweetening hydrocarbon streams is that an MEA system must follow the potassium carbonate system to remove the final traces of $H_2S$.

Removal of sulfur compounds from hydrocarbons by selective absorption using crystalline zeolitic molecular sieves has been proposed and in fact, such processes have been employed in which the sour hydrocarbon feed stream is contacted with the selective absorbent under vapor phase conditions. While such a vapor phase purification is effective, it is commercially unattractive for employment with feed streams available as liquids because of the added cost of vaporization. Furthermore, when relatively high boiling hydrocarbon streams such as heavy naphtha are to be cleaned, vapor phase adsorption requires the heating of a liquid feed to such a high temperature that the adsorptive capacity of zeolitic molecular sieves is markedly reduced.

The principal object of the invention is to provide an improved process for sweetening or removing sulfur compounds from a liquid hydrocarbon feed stream. Another object of the invention is to provide a process for sweetening a liquid hydrocarbon feed stream which has a high liquid cleaning efficiency and also permits safe and efficient regeneration of the sulfur compound removal medium. Other objects and advantages of the present invention will be apparent from the ensuring disclosure and appended claims.

In the drawing, the single figure shows a schematic flowsheet for continuously sweetening a liquid hydrocarbon feed stream according to the present invention.

The aforementioned objects are accomplished by providing a bed of crystalline zeolitic molecular sieve material having an apparent pore size of at least 3.8 angstrom units, and as an adsorption step, passing the liquid hydrocarbon feed stream downwardly through such bed from the upper to the lower end thereof. The rate of feed liquid flow is such as to maintain the bed completely filled with such liquid, thereby removing the sulfur compound from such feed stream. A sulfur-compound depleted liquid hydrocarbon stream is withdrawn from the lower end of the bed. As a desorption stroke, a heated, nonadsorbable purge gas is provided which is nonreactive with respect to sulfur. Such purge gas is passed downwardly through the sulfur compound-containing zeolitic molecular sieve bed, thereby removing the sulfur compound in the purge gas discharged from the lower end of the bed.

As a cool-down step, additional sulfur compound-containing liquid hydrocarbon feed is introduced at the upper end of the desorbed zeolitic molecular sieve bed for downward flow therethrough and at a lower rate than the adsorption step. In this manner the bed is recooled to the operating temperature during the adsorption step. Thereafter, the adsorption, desorption and cooldown steps are consecutively repeated.

It has been unexpectedly found that certain naturally occurring and synthetic crystalline zeolites of suitable pore size have a remarkably high affinity for sulfur-containing compounds present in liquid hydrocarbon streams. That is, the pores must be sufficiently large to permit entry of the sulfur compound molecules. Molecular sieves having pores with an apparent minimum dimension of at least 3.8 angstrom units have been found satisfactory when the sulfur compound impurity which is to be adsorbed is hydrogen sulfide. For normal mercaptans having less than seven carbon atoms, the apparent pore size should be at least about 4.6 angstrom units. The sulfur compounds of larger molecular dimensions such as isopropyl mercaptan, isobutyl mercaptan, t-butyl mercaptan, the isomeric form of anyl and hexyl mercaptan, and the heterocyclic sulfur compounds exemplified by thiophene as well as the aromatic mercaptans exemplified by phenyl mercaptan require the use of a zeolitic molecular sieve having apparent pore openings of at least about 8 angstrom units.

The term apparent pore size as used herein may be defined as the maximum critical dimension of the molecular species which is adsorbed by the zeolitic molecular sieve in question under normal conditions. The apparent pore size will always be larger than the effective pore diameter, which may be defined as the free diameter of the appropriate silicate ring in the zeolite structure.

The term "zeolite," in general, refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns.

The structure of crystalline zeolitic molecular sieves may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electro-valence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of absorbate molecules. Any of this space not occupied by reduced elemental metal atoms will be available for adsorption of molecules having a size, shape and energy which permits entry of the adsorbate molecules into the pores of the molecular sieves.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged.

The pores size of the zeolitic molecular sieves may be varied by employing different metal cations. For example, sodium zeolite A has an apparent pore size of about 4 angstrom units whereas calcium zeolite A has an apparent pore size of about 5 angstrom units.

Among the naturally occurring zeolitic molecular sieves suitable for use in the present invention include mordenite and chabazite both having an apparent pore size of about 4 angstrom units, and erionite having an apparent pore size of about 5 angstrom units. The natural materials are adequately described in the chemical art. The preferred synthetic crystalline zeolitic molecular sieves include zeolites A, D, K, T, X and Y.

Zeolite A is a crystalline zeolitic molecular sieve which may be represented by the formula:

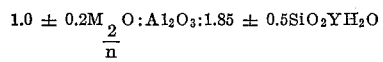

where M represents a metal, $n$ is the valence of M, and Y may have any value up to about 6. The as-synthesized zeolite A contains primarily sodium ions and is designated sodium zeolite A. All of the monovalent cation forms of zeolite A have an apparent pore size of about 4 angstroms, excepting the potassium form which has a pore size of about 3 angstroms and consequently is unsuitable for use in the present invention. When at least about 40 percent of the monovalent cation sites are satisfied with di- or trivalent metal cations, zeolite A has an apparent pore size of about 5 angstroms. Zeolite A is described in more detail in U.S. Patent No. 2,882,243 issued April 14, 1959 to R. M. Milton.

Zeolite D has an apparent pore size of about 4 angstroms, and is described and claimed in U.S. patent application Serial No. 680,383 filed August 26, 1957 now abandoned.

Zeolite L has an apparent pore size of about 10 angstroms, and is described and claimed in U.S. patent application Serial No. 711,565 filed January 28, 1958 now abandoned.

Zeolite R has an apparent pore size of about 4 Angstroms, and is described and claimed in U.S. Patent No. 3,030,181 issued April 17, 1962 to R. M. Milton.

Zeolite T has an apparent pore size of about 5 Angstroms, and is described and claimed in U.S. Patent No. 2,950,952 issued August 30, 1960 to D. W. Breck et al.

Zeolite X has an apparent pore size of about 10 Angstroms, and is described and claimed in U.S. Patent No. 2,882,244 having issued April 14, 1958 to R. M. Milton.

Zeolite Y has an apparent pore size of about 10 Angstroms, and is described and claimed in U.S. Patent application Serial No. 109,487 filed May 12, 1961.

The remarkable high capacity of the present zeolitic molecular sieves for sulfur compounds contained in liquid hydrocarbon streams is illustrated by the following equilibrium data in Table I on adsorption of $H_2S$ from liquid n-hexane on ⅛-inch pellets of molecular sieves material at 25° C.

TABLE I

| Type of Molecular Sieve | Feed $H_2S$ Concentration (p.p.m. by wt.) | $H_2S$ Loading (lb./100 lb. activated sieve) |
|---|---|---|
| Sodium zeolite A | 150 | 7.3 |
|  | 350 | 9.1 |
|  | 1,780 | 11.6 |
| Sodium zeolite X | 2,450 | 7.4 |

Referring now more specifically to FIG. 1, two beds 10 and 11 of crystalline zeolitic molecular sieve material are provided and piped in parallel flow relation so that when one bed is on the adsorption stroke, the other bed is being regenerated by purging and cooldown. In this manner, a continuous supply of sulfur compound-depleted hydrocarbon liquid is available for consumption. If a continuous supply is not required, it may be preferable to employ a single bed of zeolitic molecular sieve adsorbent, and provide a product liquid supply during the intermittent periods when such bed is on adsorption stroke.

The sour sulfur compound-containing liquid hydrocarbon feed stream is introduced through conduit 12, preferably at ambient temperature although there is no sharply defined critical region in this respect. Choice of the optimum temperature depends on an economic balance between savings in zeolitic molecular sieve material by virtue of higher adsorptive capacities at lower temperatures, and the cost of heat exchangers to obtain the lower temperature. Viscosity may also be a limitation on heavy naphtha streams. With regard to feed pressure, the only limitation in this respect is that the pressure be sufficiently high to keep the feed in the liquid phase throughout the adsorber bed to avoid internal flashing with consequent poor contact with the molecular sieve and attrition of particles.

It has been found that the adsorption step may be efficiently performed with feed liquid superficial linear velocities of 0.1 to 20 feet per minute, and preferably between 1 and 10 feet per minute. The reasons for these criticalities are as follows: at low superficial linear velocities, a thin film of liquid exists on the exterior surface of each zeolitic molecular particle, primarily due to the viscosity of the hydrocarbon feed liquid. The sulfur compound must pass through this film for flow through the pores and into the inner cage of the crystal structure for adsorption thereby, and such passage is resisted by the film so as to decrease the adsorption rate. As the feed liquid velocity increases the thickness of the liquid film decreases, thereby reducing the external film resistance and increasing the rate of adsorption. Finally as the superficial linear velocity is further increased, the liquid film is substantially eliminated and the efficiency of the adsorption step becomes primarily dependent on contact time between the sulfur compound containing feed stream and the zeolitic molecular sieve. That is, sufficient time must be provided for the sulfur compound to transfer from the feed stream to the molecular sieve, and higher feed liquid velocities will of course reduce such contact time. Still another characteristic of higher superficial linear velocities is increased pumping costs. It has been found that a superficial linear velocity of below 0.1 feet per minute produces an excessively high external film resistance, while a velocity of over 20 feet per minute does not permit sufficient contact time for high adsorptive efficiency. Within this broad range, the adverse effect of the external liquid film is essentially eliminated at a velocity above 1 foot per minute. Also, the required bed length becomes unduly long when the superficial linear velocity is above 10 feet per minute, due to the reduced contact time and lower adsorptive efficiency.

The process will efficiently handle feed streams containing minute traces of sulfur on the order of $0.5 \times 10^{-4}$ wt.-percent (0.05 grain per 100 standard cubic feet of feed stream) up to those containing 5 wt.-percent sulfur compounds. This process is particularly advantageous in the sulfur trace concentrations because of the relatively high sulfur loadings attainable on crystalline zeolitic molecular sieves as illustrated in the previous Table I. Also, the sweetened liquid from which the minute traces have been adsorbed, contains essentially no sulfur as illustrated in the succeeding Examples I and II wherein the effluent met the standard copper strip test for sweetened propane.

The upper limit of 5 weight percent sulfur compound concentration in the feed liquid is based on the fact that liquid phase adsorption becomes impractical when the sulfur concentration exceeds this level since the duration of the adsorption step becomes relatively short as compared with the necessary duration of the desorption and cooldown steps. Stated in another way, a prohibitively large adsorption bed would be required to obtain an adsorption step of specified duration if the sulfur concentration exceeds 5 weight percent.

The hydrocarbon feed streams most commonly treated by the present method are propane, butane, propylene, light naphtha comprising molecules with five to eight carbon atoms in the boiling range of 85° to 250° F., and heavy naphtha comprising molecules with eight to thirteen carbon atoms in the boiling range of 225 to 450° F. The sulfur compounds encountered are $H_2S$, COS, methyl, ethyl, propyl and heavier mercaptans, and cyclic sulfur compounds such as thiophene. Sodium zeolite X having an apparent pore size of about 10 angstrom units is the preferred selective adsorbent as it will generally remove all of these sulfur compounds from all of the foregoing feeds except the heavy naphtha. However, only the mercaptans and thiophene can be removed from the heavy naphtha. It should be noted, however, that if only $H_2S$ must be removed from heavy naphtha or even light naphtha, a bed of sodium zeolite A having an apparent pore size of 4 angstroms may be used.

The sulfur-containing liquid hydrocarbon feed stream is directed from conduit 12 to communicating conduit 13 joining at its opposite end with the inlet and upper end of first zeolitic molecular sieve bed 10. Conduit 13 also contains flow control valves 14 and 15 arranged in a series relationship. For purposes of illustration it may be assumed that the first zeolitic molecular sieve bed is fully activated, in which case the liquid stream of sour hydrocarbon feed is fed into the upper end of bed 10 to flow downwardly therethrough. Although the sulfur compounds present in impurity concentrations in the hydrocarbon feed are preferentially more strongly adsorbed on the crystalline zeolitic molecular sieve material than the hydrocarbon, the hydrocarbon will initially be adsorbed in greater quantities in the activated selective adsorbent. This is because the sulfur compounds, although completely adsorbed, only represent a small proportion of the adsorbable constituents of the feed liquid.

Discharge conduit 16 communicates with the lower end of bed 10, and contains flow control valves 17 and 18 arranged in series relationship, and valve 17 is at least partially closed during the initial part of the adsorption stroke, so that the bed may be filled with liquid hydrocarbon feed. This feature of the invention has been found to provide unexpected advantages since the adsorption of large quantities of the hydrocarbon generates considerable heat resulting in vaporization and pressure formation. That is, filling the bed in a downward flow direction effects a cooling action at the adsorption heat-generating zone. Control by means of valves 14 and 15 should be exercised over the rate at which the liquid is introduced during the filling step to avoid channeling of the liquid downwardly through the bed 10 as this may result in premature vaporization in the lower regions of the bed with resultant pressure buildup and violent movement of the bed. Flow distributing devices as are well understood by those skilled in the art, may be employed to prevent such channeling.

When the zeolitic molecular sieve bed 10 is filled with liquid, the withdrawal of purified liquid hydrocarbon product from the lower end of the bed is begun through conduit 16 and control valves 17 and 18 therein. The sweetened liquid hydrocarbon product stream is discharged from the system through communicating conduit 19. Simultaneously the sour liquid hydrocarbon feed stream is introduced through valves 14 and 15 at a rate sufficient to maintain bed 10 completely filled with liquid, since it has been discovered that vapor-liquid mixtures provide poor contact between the fluid and the crystalline zeolitic molecular sieve. This in turn results in poor utilization of the selective adsorbent bed and excessive channeling. As the adsorption step or stroke is continued, the sulfur compounds are selectively adsorbed by the molecular sieve in a downwardly advancing zone, in which zone the previously adsorbed hydrocarbon is being displaced by the sulfur compounds. The liquid removal step is downward to afford superior drainage, and thus improve the efficiency of the adsorption step.

The adsorption step may be continued until the appearance of sulfur compounds in the product indicates that the capacity of the molecular sieve has been attained. At this point, however, the free spaces in the bed not occupied by molecular sieve material are filled with sour liquid hydrocarbon which must either be sent to a fresh molecular sieve bed or discarded. In a preferred embodiment, valve 15 through which the sour feed enters bed 10 is closed when the latter has only sufficient remaining adsorptive capacity to remove the sulfur compound contained in the liquid remaining in the free spaces or interstices of the bed. This point may be found experimentally by first determining the time at which the effluent initially contains appreciable quantities of sulfur compounds, and then progressively reducing the duration of the adsorption step until a point is reached at which the last portion of the effluent meets the desired specifications as to effluent sulfur content. Thus, the efflux of purified liquid hydrocarbon product can in this manner be continued until all of the liquid in the bed is recovered.

At this point, valves 17 and 18 are closed and the sour liquid hydrocarbon fed stream is diverted from conduit 12 through communicating conduit 20 to second zeolitic moleclular sieve bed 11 which has previously been desorbed and recooled. The depressurization or blowdown of first bed 10 should be carried on gradually to prevent excessive flashing, movement of the pellets and attrition. A 15-minute period for the blowdown step has been found satisfactory. In the desorption step, a hot substantially nonadsorbable purge gas is supplied to conduit 21 at a temperature preferably between 350° F. and 600° F., the purge gas being nonreactive with respect to sulfur. Suitable purge gases include methane, hydrogen, nitrogen and carbon monoxide. These gases have molecular dimensions sufficiently small to pass through the pores of the present crystalline zeolitic molecular sieves and thus be adsorbed therein, but their respective boiling points are sufficiently low so that the attractive forces between the pore walls and the molecules are so small as to prevent substantial adsorption.

The nonadsorbable purge gas is directed through conduit 21 and control valve 22 therein to branch conduit 23 containing valve 24. Conduit 23 joins inlet conduit 13 between valves 14 and 15, and the hot purge gas is introduced therethrough to the upper end of first zeolitic molecular sieve bed 10 for downward flow and removal of the adsorbed sulfur compound. The cooled and sulfur compound laden purge gas is discharged from the lower end of first bed 10 through conduit 16 containing valve 17, and directed through branch conduit 25 containing valve 26 therein to discharge conduit 27 for use as desired. For example, the spent purge gas may be directed to a fuel system or flared to the atmosphere. The purge gas flow is continued in this manner until the first bed 10 is fully reactivated, for example, at a bed temperature of about 350° F.

In a preferred embodiment, the liquid hydrocarbon held in the interstices of the first zeolitic molecular sieve bed 10 is drained therefrom at the end of the adsorption step and before the previously described desorption step is initiated. This permits recovery of the interstitial liquid and improves the efficiency of the cycle. Such drainage may be effected in several ways following the closing of liquid hydrocarbon feed inlet valve 14. For example, if the interstitial liquid will vaporize at a slightly lower pressure, valves 17 and 18 are kept open and sufficient liquid is vaporized within the bed to force the remaining interstitial liquid out through sweetened product conduit 19. Alternatively, if there is insufficient pressure available from vaporization, a cold nonadsorbable gas may be introduced through conduit 28 and control valve 29 therein to branch conduit 23. The cold nonadsorbable gas should be nonreactive with respect to the adsorbed sulfur compound, and may for example be methane, hydrogen, nitrogen or carbon monoxide. It may thus be seen that the cold displacement gas may be supplied from the same source as the hot nonadsorbable purge gas. The cold displacement gas is introduced through conduit 23 and communicating conduit 13 with control valve 15 therein to the upper end of first bed 10 for displacement of the interstitial liquid from the bed.

As a further alternate method for displacing the interstitial liquid from the sulfur compound-loaded bed 10, conduit 28 may be eliminated and a small amount of heated nonadsorbable purge gas may be introduced through conduit 21 for displacement purposes.

The desorption step is downward from the inlet to the discharge end because a portion of the liquid left on the bed at the end of draining is driven off as a liquid. This means that the heat to be supplied in the purge gas is reduced since vaporization heat for the drained portion of liquid is not required. If the desorption step were upward, an appreciable quantity of additional heat would be needed to vaporize this liquid for removal from the upper end of the bed as a vapor.

At the end of the previously described desorption step, the reactivated first bed 10 is recooled by a controlled introduction of sour liquid feed through conduit 13 into the upper end of bed 10 for downward flow therethrough. The precooling step is conducted downwardly from the inlet to the discharge end to prevent excessive temperature rises and flashing since the downwardly advancing liquid front recools the rising convective currents of generated vapor. To achieve this flow, valves 14, 15, 17 and 26 are opened, and valve 24 is closed. The small amount of vaporized feed may be passed to waste or flared. It has been found that about 20–35 gallons of coolant are required per 100 pounds of molecular sieve to be cooled. The coolant is preferably fed at a rate of 1–4 gallons per minute per square foot of bed cross section, the maximum rate being 8 gallons per square foot per minute. Cooling is continued until the bed is full of liquid and essentially at the temperature of the adsorption stroke. Valve 26 is then closed and valve 18 opened, and the first bed 10 is placed back on the adsorption stroke.

It should be noted that the second bed 11 of zeolitic molecular sieve material is operated in a manner analogous to that of first bed 10 so that during the adsorption step, sour feed is introduced through conduit 12 to communicating conduit 20 having flow control valves 31 and 32 arranged in a series relationship at the upper end of bed 11. The sweetened hydrocarbon liquid is withdrawn from the lower end of second bed 11 through conduit 33 having flow control valves 34 and 35 therein arranged in series. During the desorption stroke, the hot purge gas is introduced through valve 36 in branch conduit 23 communicating with conduit 20, the sulfur compound-laden purge gas discharged from the lower end of second bed 11 is removed from the system through valve 37 in conduit 25.

The following numerical examples illustrate the practice of this invention:

*Example I*

Ninety-five gallons per minute of liquid propane at 225 p.s.i.a. and ambient temperature, and containing 0.18 grains of $H_2S/100$ s.c.f. were fed to the top of a 20-inch I.D. by 96-inch high bed of sodium zeolite X having an apparent pore size of about 10 angstrom units. The bed contained 750 lbs. of $\frac{1}{16}$-inch pellets. After about 12 hours on-stream, the adsorption step was terminated. During this period, the effluent propane met the copper strip specification ASTM D130–56 as to sulfur content. The bed was then depressurized through a valve in the bottom at a controlled rate to reach the desired pressure of 135 p.s.i.a. in about 15 minutes. The bed was then desorbed at 135 p.s.i.a. by passage of natural gas (essentially methane) heated to 400° F. at a rate of 50,000 s.c.f.h. for 4 hours. Flow was downward and the effluent gas went to the plant fuel system. Finally, the bed was cooled by the introduction of sour liquid propane feed into the top of the bed at a rate of 4–8 gallons per minute, for a period of about 30–60 minutes. At the end of this period the bed had returned to ambient temperature and was liquid-filled.

*Example II*

Eighty-five gallons per minute of liquid propane at 205 p.s.i.a. and ambient temperature were fed to the top of a 30-inch I.D. by 114-inch deep bed containing 2000 pounds of $\frac{1}{16}$ inch pellets of zeolite X material having an apparent pore size of about 10 angstrom units. The sulfur content of the feed was 0.7 grain $H_2S/100$ s.c.f. and 0.2 grains mercaptan/100 s.c.f. After about 12 hours on-stream, the adsorption step was terminated. During this period, the effluent propane again met the copper strip specification ASTM D130–56 as to sulfur content. The bed was next depressurized through a valve in the bottom at a controlled rate to reach the desired pressure of 135 p.s.i.a. in about 15 minutes. The bed was then desorbed at 135 p.s.i.a. by passage of natural gas heated to 550° F. at a rate of 50,000 s.c.f.h. for 4 hours. The higher desorption temperature was used because of the presence of more difficultly desorbable mercaptans. Flow was downward from the inlet to the discharge end of the bed and the effluent gas was directed to the plant fuel system. Finally, the bed was cooled by the introduction of sour feed propane to the top of the bed at a rate of 8 gallons per minute for a period of about 60 minutes. The vaporized propane was piped to the plant fuel system, and at the end of this period the bed had returned to ambient temperature and was liquid-filled.

Although the preferred embodiments have been described in detail, it is contemplated that modifications of the method may be made and that some features may be employed without others, all within the spirit and scope of the invention as set forth herein.

What is claimed is:

1. A method for removing sulfur-containing compound from a liquid hydrocarbon feed stream comprising the steps of providing a bed of crystalline zeolitic molecular sieve material having an apparent pore size of at least 3.8 angstrom units and sufficiently large to receive said sulfur-containing compound; providing a sulfur compound containing liquid hydrocarbon feed stream selected from the group consisting of propane and butane and as an adsorption step passing such liquid stream downwardly through the zeolitic molecular sieve bed from the upper to the lower end thereof at a rate such as to maintain the bed completely filled with the liquid feed stream and at a superficial linear velocity of 1–10 feet per minute, thereby removing the sulfur compound from such feed stream; withdrawing a sulfur-compound depleted liquid hydrocarbon stream from the lower end of said bed; terminating the liquid feed flow to said bed and draining the liquid feed held in the bed interstices at the end of the adsorption step, thereafter as a desorption step, providing a heated, substantially nonadsorbable purge gas being nonreactive with respect to sulfur, and passing such purge gas downwardly through the sulfur compound-containing zeolitic molecular sieve bed from the upper end thereof thereby removing said sulfur compound, and discharging the sulfur compound containing purge gas from the lower end of such bed; as a cooldown step introducing additional sulfur compound-containing liquid hydrocarbon feed at the upper end of the desorbed zeolitic molecular sieve bed for downward flow therethrough and at a lower rate than said adsorption step so as to recool such bed to the bed temperature during the adsorption step bed to the bed temperature during the adsorption step and refill the bed with liquid prior to said adsorption step; and thereafter consecutively repeating said adsorption, desorption and cooldown steps.

2. A method according to claim 1 in which hydrogen sulfide constitutes said sulfur-containing compound.

3. A method according to claim 1 in which at least one normal mercaptan containing less than seven carbon atoms constitutes said sulfur-containing compound, and said crystalline zeolitic molecular sieve material has an apparent pore size of at least 4.6 angstrom units.

4. A method according to claim 1 in which said sulfur-containing compound is a member selected from the group consisting of a branched chain mercaptan, aromatic mercaptans and thiophene, and said crystalline zeolitic molecular sieve material has an apparent pore size of at least 8 angstrom units.

5. A method according to claim 1 in which the substantially nonadsorbable purge gas is a member selected from the group consisting of methane, hydrogen, nitrogen and carbon monoxide.

6. A method according to claim 1 in which the heated purge gas is provided at a temperature of 350–600° F. during the desorption step.

7. A method according to claim 1 in which the adsorption step is terminated when the zeolitic molecular sieve bed has only sufficient remaining adsorptive capacity to remove the sulfur compound contained in the liquid hydrocarbon feed stream held in the interstices of such bed.

8. A method according to claim 1 in which the liquid feed held in the interstices of the bed at the end of said adsorption stroke is removed therefrom before initiating said desorption stroke by reducing the bed pressure sufficiently to generate vapor which forces the remaining liquid from the bed.

9. A method according to claim 1 in which the liquid feed held in the interstices of the bed at the end of said adsorption stroke is removed therefrom before initiating said desorption stroke by providing a source of gas being nonreactive with respect to sulfur, and introducing such nonreactive gas to the upper end of said zeolitic molecular sieve bed and in sufficient quantity to force the interstitial liquid downwardly and out the lower end of such bed.

10. A method according to claim 1 in which the sulfur content of said liquid hydrocarbon feed stream is between about $0.5 \times 10^{-4}$ and 5% by weight of such stream.

11. A method according to claim 1 in which a portion of said liquid hydrocarbon feed is initially adsorbed during the adsorption step and progressively displaced by an advancing zone of more strongly adsorbed sulfur compound moving from the upper to the lower end of said zeolitic molecular sieve bed.

References Cited by the Examiner

UNITED STATES PATENTS

| | | | |
|---|---|---|---|
| 2,850,549 | 9/58 | Ray | 260—676 |
| 2,881,862 | 4/59 | Fleck et al. | 260—676 |
| 2,882,243 | 4/59 | Milton | 260—676 |
| 2,894,998 | 7/59 | Hess et al. | 260—676 |
| 2,920,038 | 1/60 | Feldbaver et al. | 260—676 |
| 2,921,104 | 1/60 | Haensel | 260—676 |
| 2,958,714 | 11/60 | Kearby | 260—676 |
| 3,051,646 | 8/62 | Brooke | 208—91 |

ALPHONSO D. SULLIVAN, *Primary Examiner.*